United States Patent [19]

Twomey et al.

[11] Patent Number: 4,517,842
[45] Date of Patent: May 21, 1985

[54] FLUID PRESSURE TRANSDUCER

[75] Inventors: James R. Twomey; Hugh W. McCutcheon; Richard K. Harris, all of Seattle, Wash.

[73] Assignee: Slope Indicator Co., Seattle, Wash.

[21] Appl. No.: 438,594

[22] Filed: Nov. 2, 1982

[51] Int. Cl.³ ............................................. G01N 33/24
[52] U.S. Cl. ...................................... 73/701; 73/706; 73/716
[58] Field of Search ................. 73/716, 706, 707, 715, 73/701; 200/81.8

[56] References Cited

U.S. PATENT DOCUMENTS

| | | | |
|---|---|---|---|
| 1,121,105 | 12/1914 | Karlson | 73/707 |
| 2,147,031 | 2/1939 | Hastings | 73/707 |
| 3,365,949 | 1/1968 | Robinson | 73/715 |
| 3,388,598 | 6/1968 | Hall | 73/715 |
| 3,456,509 | 7/1969 | Thordarson | 73/715 |
| 3,574,284 | 4/1971 | Thordarson | 73/715 |
| 3,593,582 | 7/1971 | Birkmeyer | 200/81.8 X |
| 3,865,100 | 2/1975 | Kanai | 73/707 |
| 3,950,997 | 4/1976 | Hernandez | 73/729 |
| 4,052,903 | 10/1977 | Thordarson | 73/731 |
| 4,090,397 | 5/1978 | Hancock | 73/716 |
| 4,201,081 | 5/1980 | Bonomo | 73/706 |

OTHER PUBLICATIONS

Slope Indicator Co. publication "Pore Pressure System" (560 Series).
Slope Indicator Co. publication "Pore Pressure Measurement System".
PMC publication "Tank Level Transmitter", (Mar. 1975).

Primary Examiner—Donald O. Woodiel
Assistant Examiner—Vincent P. Kovalick
Attorney, Agent, or Firm—David L. Garrison; Ford E. Smith

[57] ABSTRACT

A fluid pressure transducer of the null balance type in which a fluid whose pressure is being sensed acts against one face of a diaphragm and a balancing control fluid acts against the opposite face. Control fluid pressure is uniformly distributed against the control face of the diaphragm by a porous element, preferably made of a sintered material. Movement or displacement of the diaphragm opens a sensing element and may be controlled by use of a similar pressure distributing porous element placed on the sensing side. The volume defined between the two porous elements limits maximum diaphragm travel and displacement. Transducers made according to the invention have high sensitivity. The transducers are particularly well adapted for measurement of pore pressure in earth fills or natural geological environments.

28 Claims, 6 Drawing Figures

FLUID PRESSURE TRANSDUCER

BACKGROUND OF THE INVENTION

The present invention is a fluid pressure transducer having high accuracy and repeatability. It is particularly useful for pore pressure measurement in landfills and in natural alluvial sediments and similar geologic formations.

A knowledge of ground water pressure is important in the design and maintenance of construction projects such as large highway cuts and fills, earth filled dams, and similar engineering projects. Advanced knowledge of ground water pressures enables the project to be designed so as to withstand the most severe pressures which are expected. Knowledge of pore pressures is also critical in monitoring areas which may have a tendancy to slide. When critical levels are approached, measures can then be taken to remove equipment and personnel until conditions are again safe.

It is common practice to bury pore pressure transducers permanently. This can be done either in bore holes made especially for the purpose, or in construction fills as they are aggraded. For this reason, the transducer should be relatively small and inexpensive and not subject to failure from such means as corrosion, fatigue, or other deterioration of operating parts.

Most pore pressure transducers operate on a null balance principle. Water or other fluid in the area where the transducer is installed acts against one side of a flexible diaphragm. Most typically, air or another gas such as nitrogen is supplied from a pressurized supply source to the other side of the diaphragm. At the point where the pressures on the two sides of the diaphragm are balanced some means is provided to indicate the pressure at the point of installation. Simpler devices, such as the one shown in U.S. Pat. No. 3,318,140 to Shields et al., simply insert a long liquid filled tube to the point of measurement. This has a pressure gauge at the above ground end of the tube which gives a rough indication of the underground pore pressure.

Somewhat more sophisticated instrumentation is disclosed in U.S. Pat. No. 3,365,949 to Robinson and U.S. Pat. No. 3,388,598 to Hall. These are of the diaphragm type mentioned above. The transducers are equipped with two lines which run to the above ground measurement point. One serves as a fluid supply line while the other is connected to a pressure gauge or equivalent measurement device. The diaphragm is held against the ends of the tubes by the water pressure at the measurement location. Gas is introduced against the opposite side of the diaphragm through one of the tubes. When the pore pressure is exceeded the diaphragm moves slightly and lifts off the end of the other tube connected to the gauge. Ultimately, a point of equillibrium is reached and the gauge pressure gives a close approximation of the pore pressure. With devices of this type a number of measurements are frequently made in which supply pressure is cyclically increased and decreased around the null point. This is necessary to overcome errors introduced by large pressure drops along the supply tubing.

Devices of the Hall and Robinson type tend to lose some accuracy because the control or inlet fluid acts only against a small portion of the diaphragm. A somewhat different arrangement is seen in U.S. Pat. Nos. 3,456,509 and 3,574,284 to Thordarson. In Thordarson's transducer units the pore pressure acts against the diaphragm which, in turn, holds a ball check valve open. To take a measurement the system is pressurized. When the internal pressure equals the pore pressure the ball check closes. At that time there is no more communication between the pressure supply line and the gauge line. Even though supply line pressure is increased further the gauge pressure remains constant and is an indication of the pore pressure.

Hernandez et al., U.S. Pat. No. 3,950,997 discloses a similar null balance system in which the diaphragm is replaced by a metallic bellows. Hancock et al, U.S. Pat. No. 4,090,397, show a more sophisticated system using three tubing lines between the transducer and the measuring station. One serves as a supply line, the second is a gauge line, and the third is a vent line to the atmosphere. The pore pressure holds a diaphragm actuated seal against the vent line under normal conditions. As the pressure of the control fluid is increased the diaphragm is ultimately moved, thus opening the vent line. Further control fluid applied to the system escapes through the vent line. If flow rates are held reasonably constant, the pressure indicated by the gauge at the above ground end of the gauge line will be an indication of pore pressure.

In order to obtain accurate readings two criteria must be met. It is essential that there be no flow of the pressurizing fluid in the gauge line at the time a reading is taken. The tubing from the transducer to the ground station is normally of very small internal diameter. As noted before, any fluid flow through this tubing is subject to very large pressure drops with resulting inaccuracies in the readings. A second potential source of error is far more subtle and is one which represents a problem only in certain soil environments, such as tight clay formations. Virtually all of the prior art devices require a significant diaphragm movement at or near the null point. In a tight clay formation water movement is very slow and highly restricted. If diaphragm movement at the null point is toward the ambient water there is no place for this water to go and diaphragm displacement will be strongly resisted. If, on the other hand, diaphragm movement at the null point is away from the ambient water, cavitation will result beneath the diaphragm. Either condition causes false readings of pore pressure. To achieve the highest accuracy it is thus essential that diaphragm displacement be held to the minimum possible volume. While this situation may not be a problem in more open formations, the environment of use is a condition over which the manufacturer has no control and he must assume that his instrument will be used in the most unfavorable environments.

SUMMARY OF THE INVENTION

The present invention comprises a fluid pressure transducer of the diaphragm type in which diaphragm displacement at the null point is virtually negligible. The transducer of the present invention comprises a body member which can be either drilled or molded to a configuration necessary to contain the internal operating elements. Typically, the body member is cylindrical and will contain an internal cavity divided into two portions by a thin diaphragm. In one of these portions a porous element is located which preferably will have a distal surface oriented substantially parallel to and in close proximity to a first surface of a diaphragm. It is preferred that this porous element should have an area equal to the area of the diaphragm, although this is not essential. A control fluid inlet means enters the body and is in communication with the porous element. A sensing means is associated with the diaphragm. Diaphragm movement is sensed when the control fluid pressure on a first side of the diaphragm equals or exceeds the pressure of the fluid being measured acting against the second side of the diaphragm. The sensing means can be pneumatic, in which pressure in the transducer is sensed, or it can be electrical. In the latter case, a switch is opened or closed by movement of the diaphragm to indicate a null or balance point. Where an electrical sensing means is used to indicate null point it can also be used with a fluid system to indicate pressure. The preferred version of the transducer has a tubular fluid outlet means which passes through the porous element. This extends to about the distal surface of the porous element where it has an open end lying in a plane essentially parallel to the distal surface of the porous element and to the first surface of the diaphragm. When the transducer is in a measuring environment, the diaphragm is normally held in contact with the open end of the tubular fluid output means so as to close it in the manner of a gate or valve. When a pressure reading is to be made, a control fluid, which can be either a liquid or gas but is preferably a gas, is transmitted through the fluid inlet means and is diffused through the porous element to exert a uniform back pressure against the first face of the diaphragm. When this back pressure equals or slightly exceeds the ambient fluid pressure, the diaphragm is moved away from the open end of the outlet tube permitting fluid flow through the outlet tube.

The transducer may be either of the two tube or three tube type. The outlet tube described above serves as a vent to the atmosphere and a separate gauge tube may be supplied through the body of the transducer. The separate gauge tube will also be in communication with the porous element so that there can be a free passage of gas between the inlet tube and the gauge tube. At such time as the internal pressure overcomes the pore pressure, the outlet tube is opened and further fluid flow will occur through the outlet tube. There will be essentially no more flow through the gauge tube.

In another preferred version of the invention, a second porous element is present and is mounted in the body member in close proximity to and parallel to the second face of the diaphragm. This second porous element serves to limit travel of the diaphragm. It will also uniformly transmit the ambient fluid pressure to the second face of the diaphragm as well as to filter the fluid being sensed. As thus described, diaphragm travel can be limited to distances as small as 0.1 mm or even less.

It is an object of the present invention to provide a fluid pressure transducer which is of simple construction and gives superior accuracy in pressure readings.

It is another object to provide a fluid pressure transducer of the diaphragm type in which diaphragm displacement at or near the null point is minimized.

It is a further object to provide a fluid pressure transducer which is inexpensive and is dependable over long periods of time, even when mounted in inaccessible locations.

It is yet another object to provide a two or three tube diaphragm-type fluid pressure transducer in which fluid pressures are distributed uniformly on both sides of the diaphragm by the use of porous elements.

It is still another object of the invention to provide a pore pressure transducer which gives superior accuracy of measurement even when installed in very tight earth formations. Another object of this invention is to provide a diaphragm type valve mechanism especially adapted for use in a pore pressure measuring device in which the fluid displacement necessary to operate the valve is minimized.

These and many other objects of the invention will become readily apparent upon reading the detailed description taken in conjunction with the attached drawings.

DETAILED DESCRIPTION OF THE PREFERRED EMBODIMENTS

Figure 1:
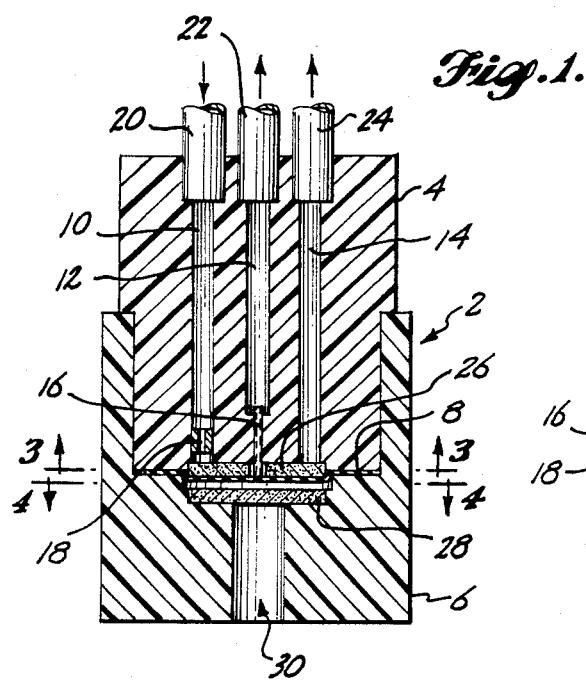
FIG. 1 is a vertical, largely cross sectional view of the transducer.

The following description is directed toward a transducer illustrated in the drawings which is particularly suitable for pore pressure measurement. This is for purposes of example only and it should be understood that the invention is far more broadly useful. It may be used in such environments as tanks, to measure depth, or mounted in pipes, as for example, on either side of an orifice plate to measure pressure drop which can be transformed into flow rates. Where sizes or materials of construction are given, it should be understood that there are many suitable equivalent dimensions or materials. Terms such as upper or lower and distal or proximal are relative and are used for the sake of description since the transducer can be used in any position.

A preferred form of the transducer for use in pore pressure measurement consists of a body member generally indicated at 2. This comprises an upper portion 4 which is machined to have a telescoping fit into a lower portion 6. A thin relatively flexible diaphragm 8 is mounted between the two body portions and serves as a fluid seal between them. The body portions may be made of any material having suitable corrosion resistance when exposed to the working environment. They can be metals such as brass or stainless steel, or plastic materials such as acrylonitrilebutadiene-styrene, nylon, polyolefins, polyvinyl chloride, etc. The diaphragms may be made of either metals or polymeric materials. In some environments of use, materials such as stainless steel, titanium, tantalum or other corrosion resistant metals could be the material of choice. In less demanding installations, elastic materials such as Buna N rubber, Viton, Teflon or similar materials are suitable. Buna N rubber has been found to be an excellent material having long term durability without fatigue or deterioration when used in underground environments.

The upper body portion contains three internal ducts. Duct 10 serves as a control fluid inlet. Duct 12 is an outlet or vent duct for the control fluid and duct 14 communicates with a pressure indicating gauge or similar sensor. Fluid outlet duct 12 terminates within the body as a metal outlet tube 16. Control fluid inlet duct 10 may optionally contain a terminal constriction 18 for reasons which will be explained later. The three internal ducts communicate with lengths of small diameter tubing 20, 22, 24 which, in turn, run to the control station. In the case of a pore pressure transducer the distance from the transducer to the control station may be as much as 1,000 meters or even more.

The metal outlet tube 16 of outlet duct 12 passes through porous element 26. This porous element should preferably have a distal surface which is essentially planar and which lies in a plane parallel to the diaphragm. Outlet tube 16 must extend at least to the distal surface of the porous element. The porous element forms a critical and very key element of the present invention. It serves to transmit the pressure of the control fluid uniformly over the first or upper face of diaphragm 8. This is a major improvement over other known devices serving a similar function which either transmit the control pressure over only a small portion of the diaphragm or require a complex internal structure with several moving parts to accomplish the same purpose.

Figure 3:
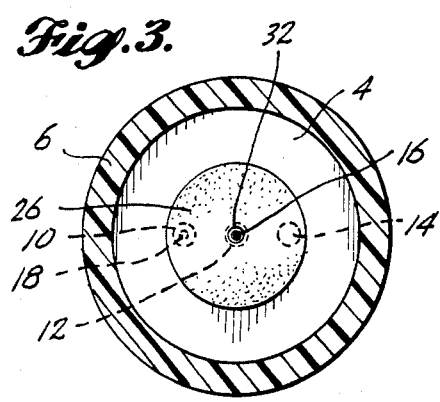
FIG. 3 is a transverse cross section taken through line 3—3 of FIG. 1.
Figure 4:
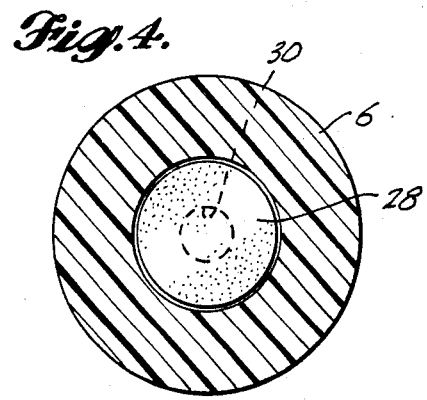
FIG. 4 is also a transverse cross section taken along line 4—4 of FIG. 1.
Figure 5:
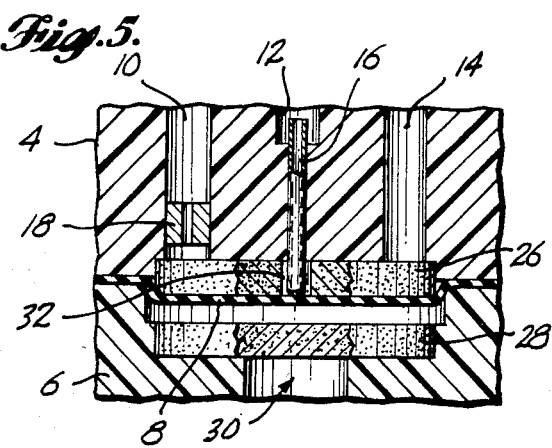
FIG. 5 is a detailed cross section showing a preferred method of construction in the area of the outlet tube.

In the most preferred version of the present invention a second porous element 28 will be present immediately below the first one. This second porous element serves at least two primary functions. The first is to support the diaphragm and to prevent undue displacement when the higher pressure is on the control side. The second function of the lower porous element is perhaps even more important. The volume 29 defined between the upper and lower porous elements controls the maximum possible displacement of the diaphragm. With the present design this spacing may be made very close so that diaphragm displacement at the control or null point is extremely small. Like upper porous element 26, the lower one serves to uniformly distribute the pressure of the fluid in the environment over the lower surface of diaphragm 8. The porous elements may conveniently be made of fritted metal, plastic, ceramic or glass. Fritted stainless steel is the material of choice for most applications. The porous elements serve a further function by acting as filters to prevent foreign matter from restricting or damaging the diaphragm. The porous elements are most conveniently made in the form of small discs, but it should be apparent that their shape is not critical. Most conveniently, the metal outlet tube 16 of fluid outlet duct 12 passes perpendicularly through the central axis of upper porous element 26. In the most preferred version of the invention an aperture 32, best seen in FIGS. 3 and 5, provides a clearance around metal outlet tube 16 so that the gas pressure in the neighborhood of the end of this tube is extremely uniform. A bore hole 30 in lower body member 6 communicates between the ambient environment being sensed and lower porous element 28.

The porous elements are set in conveniently machined shoulders in upper body portion 4 and lower body portion 6. As shown in the figures, if the diaphragm is an elastomeric material, it may be lightly tensioned by displacing it slightly with upper porous element 26.

One feature of the present construction is the very low cracking pressure required to move the diaphragm 8 from the open end of outlet tube 16. This gives the unit extremely high sensitivity.

It is desirable for the outlet tube 16 to be relatively small in diameter. The supply and outlet lines are normally made of nylon or other plastic tubing which are capable of resisting both the corrosive rigors of the environment as well as withstanding considerable mechanical abuse.

EXAMPLE

By way of example, a unit will be described which has given excellent performance in subterranean pore pressure measurement. The body is made of polyvinyl chloride with a maximum diameter of 25.4 mm and an overall height of 37.8 mm. The tubes tying the transducer element to the ground station are made of nylon and are approximately 1.7 mm outside diameter and 0.8 mm inside diameter. Internal ducts 10, 12, and 14 are also approximately 1.7 mm in diameter. The tubing is permanently set into body portion 4 with epoxy resin. However, any suitable adhesive material may be used. The upper and lower body portions are also adhesively bonded to form a permanent structure. Outlet tube 16 is formed from stainless steel hypodermic needle tubing and is approximately 0.71 mm (0.028 in) outside diameter and 0.33 mm (0.013 in) inside diameter. A desirable range for pore pressure measurement is 0.25 to 0.5 mm (0.010 to 0.020 in) inside diameter. The porous members are made of fritted type 316 stainless steel and are 11.1 mm (0.44 in) diameter and 1.65 mm (0.064 in) in thickness. They have a nominal pore size of 50 microns. The gap between the two discs is approximately 0.96 mm. Diaphragm 8 is made of Buna N rubber and is 0.38 mm (0.015 in) in thickness. The maximum possible diaphragm displacement is thus only 56 mm$^3$ or, in more familiar terms, less than 0.06 cc. The usual operating diaphragm displacement is more nearly 0.02 cc or less. Opening 30, through which the transducer communicates with its outside environment, is approximately 5 mm in diameter.

The purpose of optional constriction 18 within the control fluid inlet duct 10 will now be described. In operation, as pressure above diaphragm 8 builds up to the point that it can overcome the ambient fluid pressure, gas flow will be down the supply tube 20 and will be in an upward direction in gauge tube 24 which is used to sense the pressure at the disc 26. As the pressure reaches the null point, at which time the diaphragm is displaced away from the open end of outlet tube 16 of the vent duct, gas will begin to escape through the vent line. This may cause a pressure drop and oscillation or cycling can occur in which the diaphragm repeatedly opens and closes the opening of outlet tube 16. This oscillation or cycling can be overcome by limiting the volume of gas entering the transducer by use of an emperically sized constriction 18, or alternately, by decreasing the size of the vent tubing 16 used.

While the foregoing description has been concerned with the construction and operation of a three tube transducer, it will be evident that a construction in which either one or two porous elements are used would also be highly advantageous with a two tube type of transducer. Thus, if less ultimate precision was required, gauge duct 14 and gauge tube 24 could be omitted. Pressure would then be determined by measuring the inlet pressure at the time flow commences through vent tube 22.

Figure 2:
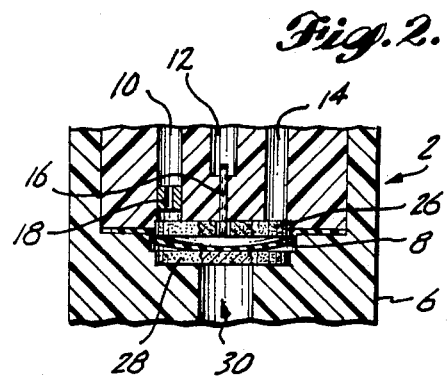
FIG. 2 is a fragmentary detailed cross section, taken from FIG. 1, showing the diaphragm in open position to allow flow through the outlet tube.

Another method of operation of the devices shown in the drawings is to over pressure the device through fluid inlet duct 10 so that the diaphragm assumes the configuration shown in FIG. 2. The pressure supplied through fluid inlet duct 10 is then interrupted and the system pressure permitted to decrease due to flow through outlet tube 16. When the pressure equalizes on both sides of the diaphragm the diaphragm moves against disc 26 and the end of outlet tube 16, thus closing and stoping flow therethrough. System pressure can then be measured in either duct 10 or 14 as an indication of the pressure of fluid below diaphragm 8.

Figure 6:
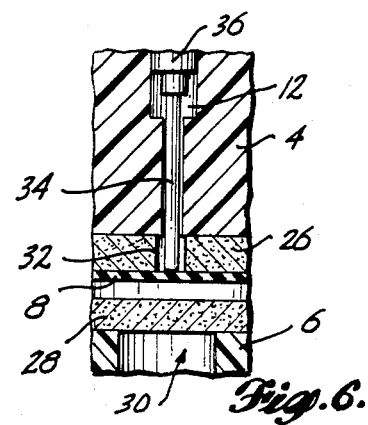
FIG. 6 is a fragmentary detailed cross section, similar to FIG. 5 showing an electrical switch as a null indicator.

An alternative construction is shown in FIG. 6. In this case an electrical switch 24 with push rod 32 serves to indicate the null point when pressure is balanced on both sides of the diaphragm. The push rod is actuated by movement of diaphragm 8. Pressure at the null point can also be read using the gauge tube in the manner of a two tube transducer.

Many other modifications will be readily apparent to those with ordinary skill in the art. The invention is thus not to be limited to the details disclosed, but is to be accorded the full scope of the following claims.

What is claimed is:

1. A fluid pressure transducer which comprises:
    a body member which contains a porous element;
    a control fluid inlet means in communication with the porous element;
    a thin diaphragm having first and second faces mounted in proximity to the porous element, the diaphragm associated with the body member to serve as a fluid tight barrier between the porous element and control fluid inlet means and a fluid whose pressure is to be measured so that control fluid may be transmitted through the fluid inlet means and porous element to exert a uniform pressure against the first face of the diaphragm; and
    sensing means associated with the diaphragm in order to sense diaphragm movement when the control fluid pressure equals or exceeds the pressure of the fluid bearing against the second face of the diaphragm.

2. The transducer of claim 1 which further includes a second porous element mounted in proximity to the second face of the diaphragm, said second porous element serving to limit travel of the diaphragm while uniformly transmitting ambient fluid pressure to the second face of the diaphragm.

3. The transducer of claim 2 in which the porous elements have generally parallel, planar faces adjacent to the diaphragm.

4. The transducer of claim 1 in which the sensing means measures the pressure of the control fluid at the null point when pressures against the opposite faces of the diaphragm are equal.

5. The transducer of claim 1 in which the sensing means is an electrical switch opened or closed by the diaphragm at the null point when pressures against the opposite faces of the diaphragm are equal.

6. The transducer of claim 1 in which the area of the porous element exposed to the diaphragm is substantially equal to the area of the diaphragm.

7. The transducer of claim 2 in which the area of each porous element exposed to the diaphragm is substantially equal to the area of the diaphragm.

8. A fluid pressure transducer which comprises;
    a body member which contains a porous element having a generally planar distal surface;
    a control fluid inlet means in communication with the porous element;
    a tubular control fluid outlet means passing through the porous element and extending substantially to the distal surface, and having an open end lying in a plane substantially parallel to said distal surface; and
    a thin diaphragm having a first face located in close proximity to and essentially parallel to the distal surface of the porous element, the diaphragm being mounted in the body means to serve as a fluid tight barrier between the porous element and control fluid means and a fluid whose pressure is to be measured, the diaphragm normally being in contact so as to close the open end of the fluid outlet means when exposed to ambient fluid pressure, so that a control fluid may be transmitted through the fluid inlet means and porous element to exert a back pressure against the first face of the diaphragm and move the diaphragm out of contact with the open end of the fluid outlet means when the back pressure exceeds the ambient fluid pressure.

9. The transducer of claim 8 which further includes a gauge tube means in communication with the porous element.

10. The transducer of claim 9 in which a second porous element is present in close proximity to the second face of the diaphragm, said second porous element serving to limit travel of the diaphragm while uniformly transmitting ambient fluid pressure to the second face of the diaphragm.

11. The transducer of claim 10 in which the porous elements are formed from fritted metal, glass or ceramic material.

12. The transducer of claim 8 in which the tubular fluid outlet means extends beyond the distal surface of the porous element.

13. The transducer of claim 12 which further includes a gauge tube means in communication with the porous element.

14. The transducer of claim 13 in which a second porous element is present in close proximity to the second face of the diaphragm, said second porous element serving to limit travel of the diaphragm while uniformly transmitting ambient fluid pressure to the second face of the diaphragm.

15. The transducer of claim 8 in which the control fluid inlet means is constricted adjacent to the porous element in order to limit control fluid flow rate and reduce any tendency for diaphragm oscillation near the control point where back pressure and ambient fluid pressure are equal.

16. The transducer of claim 8 in which the porous element is disc-shaped and is apertured to pass the tubular fluid outlet means, said aperture being of larger diameter than the outlet means to provide a space therebetween.

17. The transducer of claim 16 in which the tubular fluid outlet means extends beyond the distal surface of the porous element.

18. The transducer of claim 17 which further includes a gauge tube means in communication with the porous element.

19. The transducer of claim 18 in which a second porous element is present in close proximity to the second face of the diaphragm, said second porous element serving to limit travel of the diaphragm while uniformly transmitting ambient fluid pressure to the second face of the diaphragm.

20. The transducer of claim 16 in which the control fluid inlet means is constricted adjacent to the porous element in order to limit control fluid flow rate and reduce any tendency for diaphragm oscillation near the control point where back pressure and ambient fluid pressure are equal.

21. The transducer of claim 20 which further includes a gauge tube means in communication with the porous element.

22. The transducer of claim 21 in which a second porous element is present in close proximity to the second face of the diaphragm, said second porous element serving to limit travel of the diaphragm while uniformly transmitting ambient fluid pressure to the second face of the diaphragm.

23. The transducer of claim 8 in which a second porous element is present in close proximity to the second face of the diaphragm, said second porous element serving to limit travel of the diaphragm while uniformly transmitting ambient fluid pressure to the second face of the diaphragm.

24. A method of limiting diaphragm travel in a null-type, diaphragm actuated pressure transducer in which the diaphragm is exposed on one side to the pressure of the fluid being sensed and on the other side to the pressure of a control fluid which comprises:

providing a first porous element on the control side of the diaphragm, said element being adapted to uniformly distribute a control pressure over the control side of the diaphragm;

further providing a second porous element on the sensing side of the diaphragm, said element being adapted to uniformly distribute the pressure of the fluid being sensed over the sensing side of the diaphragm;

providing sensing means operatively associated with the diaphragm to signal a remote indicator when a null point is reached showing that control pressure and the pressure being sensed are equalized; and spacing the two porous elements a predetermined distance apart in order to define and limit the maximum displacement of the diaphragm.

25. The method of claim 24 which includes providing the porous elements with substantially planar surfaces on those portions adjacent to the diaphragm.

26. The method of claim 25 in which the porous elements are formed from a fritted metal, plastic, glass or ceramic material.

27. The method of claim 24 in which the sensing means is a valve which is opened or closed by the action of the diaphragm.

28. The method of claim 24 in which the sensing means is an electrical switch opened and closed by the diaphragm.

* * * * *